T. S. MINNISS.

Invalid Carriage.

No. 9,708.  Patented May 10, 1853.

Inventor:
Thomas S Minnes

UNITED STATES PATENT OFFICE.

THOMAS S. MINNISS, OF MEADVILLE, PENNSYLVANIA.

INVALID LOCOMOTIVE CHAIR.

Specification of Letters Patent No. 9,708, dated May 10, 1853.

*To all whom it may concern:*

Be it known that I, THOS. S. MINNISS, of Meadville, in the county of Crawford and State of Pennsylvania, have invented an Improvement in the Front Running-Gear of Invalids' Locomotive Chairs and other Carriages; and I do hereby declare that the following is a full, clear, and exact description of the construction and operation of the same, reference being had to the annexed drawings, making a part of this specification.

Figure 1:
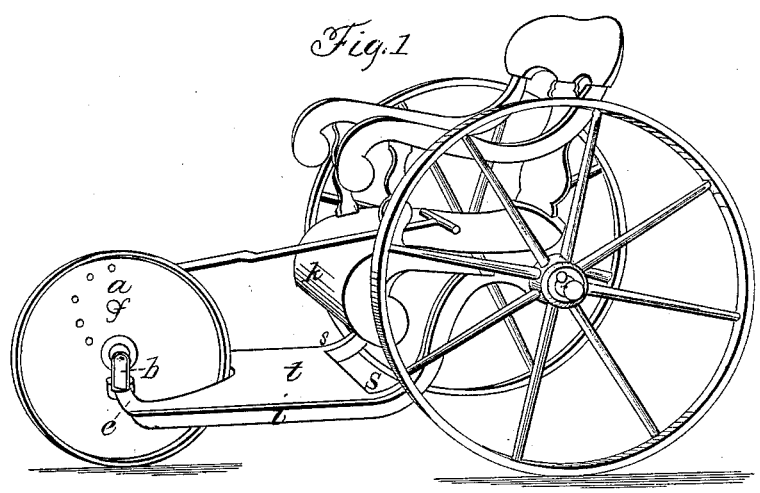
Figure 2:
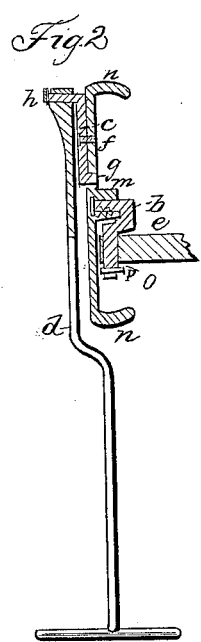
Figure 4:
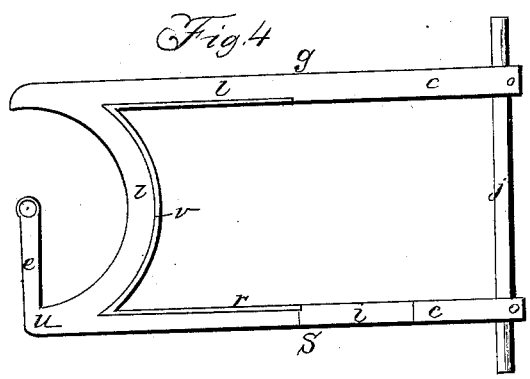
Figure 3:
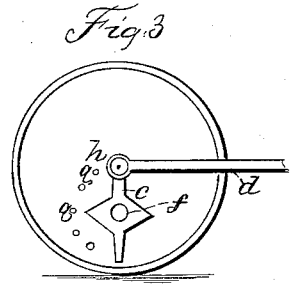

Figure 1 is a perspective view of an invalid's locomotive chair. Fig. 2 is a transverse section of the front wheel with its attachments. Fig. 3 is a reversed view of said wheel from that in Fig. 1, showing the wrist of the adjustable crank fixed on the center of the wheel. Fig. 4 is a ground view of an iron frame for a chair to be mounted on with the projecting arm in front of the half circle for the wheel to be hung to, also showing the rod for the hind axles.

The front or driving wheel as seen in Fig. 2 is so hung on the axle $b$ the shank of which passes through the end of the projecting arm $e$, at $l$ of the iron frame $i\ i\ i$ Fig. 4, that it is free to turn to the right or left, and is thus guided with ease by the leverage of the handle $a$. The hub $m$, $m$, Fig. 2 as well as the rim $n$, $n$, of the wheel being both upon one side only of the disk permits the end of the projecting arm to be brought within the disk of the wheel so that the center of the shank $o$ of the bent axle $b$ is always on a line with the central bearing of the rim $n$, $n$, and thus the bearings on the ground or floor are always the same, turn the wheel which way you will, which would not be the case was the shank $o$ out of line with the bearing of the rim nor could the wheel receive any shock on its rim without a tendency to turn aside, as by this arrangement. To effect this central bearing it will be seen in Fig. 2 that the axle is bent around the edge of the hub till the shank $o$ drops at right angles from the hole through the hub at a point just half way through, and this point half way through must always be on a line with the central bearing of the rim whatever in other respects may be the shape of the wheel. The axle is connected to the frame by the shank $o$ passing through the hole $l$, in the projecting arm and secured by a pin and washer Fig. 2, the head of the pin being next to the disk of the wheel to prevent its coming out when the wheel is on, and the wheel is secured by a pin or nut on the end of the axle sunk in a recess on its own disk leaving a plain surface for the crank and handle to sweep over.

$c$ Fig. 3 is a crank with the wrist $h$, to which is attached the handle. It is fixed to the disk of the wheel by the screw $f$, and is kept from turning on the screw by the short wrist $g$, which fits into the circular holes $q\ q\ q\ q$ by which contrivance the length of the crank can be varied at pleasure or the wrist be thrown on the center of the wheel and thus be used either by the invalid to propel himself with his own arms or when fixed on the center he can guide it when pushed from behing by another without any jar to his hands, or it can be used as a handle to draw by. To make the line of draft of the handle in a line with the direction of the wheel, it (the handle) has a bend far enough from the crank to clear the rim of the wheel when revolving. said bend see Fig. 2 being just sufficient to bring the handle on a line with the bearing of the rim and thus central with the machine.

$i\ i\ i$ Fig. 4 is a light cast iron frame with a projecting arm $e$, having a hole $l$ in its end at a point half way across the front of the semicircle and this semicircle can be a little smaller than the half diameter of the wheel as it is hung below the wheel's center and can come partly under said wheel, but if hung on a level with the axle of the wheel then the half circle must be enough larger to let the wheel play. The frame is level as far back as is necessary for a platform or footboard as at $ss$, when it rises by a curve to the height that the seat $k$ Fig. 1 should be above the footboard it is then continued back on a level, or slight falling back, forming a position for the chair to which it is secured by screws from below up into the bottom. The frame is made stiff by a deep thin flange on its lower side continued around the entire frame, through which the rod $j$ for the hind axles passes. There is a groove $r$, $r$, $r$, to receive the footboard within the frame.

The proportion of parts for a practical chair should be as follows: The diameter of the driving wheel 13 inches, the cast iron frame in Fig. 4 1 inch wide and ⅛ in. thick, depth of flange 1½ inches and ⅛ in. thick except where the projecting arm is united to the frame at the angle $u$ where it should be much thicker. The length of the shank $o$ Fig. 2 from the shoulder should be $1\frac{1}{2}$ inches, besides $\frac{1}{2}$ in. for the washer and pin, the shank should be $\frac{1}{2}$ in. in diameter where it passes through the arm, then $\frac{1}{2}$ in. square around the shoulder to where the axle sets off from it through the wheel. The hub should be about an inch in diameter with a $\frac{3}{8}$ in. hole—the size of the axle; the disk of the wheel $\frac{1}{8}$ of an inch thick or less; the rim $\frac{1}{4}$ in. thick and $1\frac{1}{4}$ inches wide and the recess for linch pin $\frac{3}{16}$ inch deep. These dimensions will give a space of 4 inches from the floor to the underside of the platform and $5\frac{1}{2}$ to the upper side. To elevate the seat 10 inches in front and 9 inches behind the seat being 2 inches thick and the axle rod an inch below the bottom would require the hind wheels to be 23 inches in diameter but if smaller wheels are used or the seat is made of thinner material, then by curling down the flange at the back end where the hind axles passes through, the same or other proportions may be preserved, as every inch the rod is depressed will subtract 2 inches from the diameter of the hind wheels. The width of frame and seat corresponding to the above dimensions would be 18 inches.

I do not however confine myself to any precise form or size of chair or frame further than the projecting arm within the disk of the wheel as I do not claim further, and this projecting arm can be a simple bar of iron bent at right angles one angle being secured by screws or otherwise to one side of a plank of proper width circled out in front with a common chair mounted on its back end with two plain hind wheels and would with the other parts claimed afford a cheap and efficient perambulator for the afflicted poor who will perhaps oftener need its assistance than the wealthy who can afford those of costlier structure.

Neither do I confine the application of the parts claimed to an invalid's chair for by adapting the size to the purpose required, it can be substituted for the front wheels of children's carriages, larger vehicles, and many agricultural machines, the handle answering for a tongue for animals to draw by—dispensing with much rigging in the framework of carriages and relieving the team entirely of all jar on the tongue from inequalities of the road while it can be turned with almost the facility of a two wheeled vehicle.

What I claim as my invention and desire to secure by Letters Patent is—

1. The combination of the wheel axle and shank on the end of the projecting arm, by which a central support is given to the frame within the disk of the wheel, the bearing in the hub being central with the bearing of the rim permitting a free lateral movement to the wheel without changing its point of support to the frame and enabling the wheel to receive any shock on its rim with firmness while its plain surface is left unobstructed for the free movements of the crank and handle.

2. I also claim the arrangement of the adjustable handle which can be used to pull the chair or as a guide in the hands of the invalid when pushed by another, or changed to a crank of various length of stroke to suit the invalid when he wishes to propel himself with his own hands. The materials used in the construction of said machine being wood, iron, or other material as convenience or fancy may dictate.

THOS. S. MINNISS.

Witnesses:
A. K. RAY,
COOPER RAY.